US006849807B2

(12) United States Patent
Casey et al.

(10) Patent No.: US 6,849,807 B2
(45) Date of Patent: Feb. 1, 2005

(54) SEAT WEIGHT MEASUREMENT SYSTEM

(75) Inventors: Gary Casey, Moorpark, CA (US); Alan Cross, Thousand Oaks, CA (US)

(73) Assignee: Kavlico Corporation, Moorpark, CA (US)

( * ) Notice: Subject to any disclaimer, the term of this patent is extended or adjusted under 35 U.S.C. 154(b) by 102 days.

(21) Appl. No.: 10/166,235

(22) Filed: Jun. 3, 2002

(65) Prior Publication Data

US 2003/0071491 A1 Apr. 17, 2003

Related U.S. Application Data

(60) Provisional application No. 60/298,234, filed on Jun. 13, 2001.

(51) Int. Cl.[7] .......................... B60K 28/04; G01G 19/52
(52) U.S. Cl. ........................ 177/144; 180/273; 280/735
(58) Field of Search ............................... 177/144, 136, 177/210 R; 180/273; 280/735

(56) References Cited

U.S. PATENT DOCUMENTS

| | | | |
|---|---|---|---|
| 5,232,243 A | 8/1993 | Blackburn et al. | 280/732 |
| 5,971,432 A | 10/1999 | Gagnon et al. | 280/735 |
| 6,039,344 A | 3/2000 | Mehney et al. | 280/735 |
| 6,069,325 A | 5/2000 | Aoki | 177/136 |
| 6,092,838 A | 7/2000 | Walker | 280/735 |
| 6,161,891 A | 12/2000 | Blakesley | 296/65.01 |
| 6,231,076 B1 | 5/2001 | Blakesley et al. | 280/735 |
| 6,259,167 B1 * | 7/2001 | Norton | 307/10.1 |
| 6,323,444 B1 * | 11/2001 | Aoki | 177/144 |
| 6,343,683 B1 * | 2/2002 | Aoki et al. | 192/98 |
| 6,617,531 B1 * | 9/2003 | Aoki | 177/144 |

FOREIGN PATENT DOCUMENTS

| | | |
|---|---|---|
| DE | 100 11 371 A | 9/2000 |
| DE | 100 11 372 A | 9/2000 |
| EP | 0 950 560 A | 10/1999 |
| JP | 2001 150997 A | 6/2001 |

* cited by examiner

Primary Examiner—Randy W. Gibson
(74) Attorney, Agent, or Firm—Jeffer, Mangels, Butler & Marmaro LLP

(57) ABSTRACT

A weight measurement system is disclosed for measuring the weight of an occupant in a vehicle seat. In a preferred embodiment, a sensor is positioned at the rear portion of the vehicle seat and a load transfer link is used to transfer the weight from the front portion of the vehicle seat to the rear portion, to be measured by the sensor. The transfer link is a selectively compliant beam having a first rigid section and a second rigid section connected to each other via a flexible area. The first and second rigid sections preferably include wing portions for increasing the rigidity of the sections. The flexible area is more compliant than the rigid sections. The load transfer link is configured to transition a load placed on the front portion of the link to the rear portion. In a more preferred embodiment of the invention, the load transfer link is made of a high strength, low alloy steel.

19 Claims, 10 Drawing Sheets

SEAT WEIGHT MEASUREMENT SYSTEM

CROSS-REFERENCE TO RELATED APPLICATION

This application claims priority from U.S. Provisional Patent Application No. 60/298,234 filed on Jun. 13, 2001.

FIELD OF THE INVENTION

The present invention relates to a system for accurately detecting the weight of a person seated in a vehicle seat.

BACKGROUND OF THE INVENTION

Automobiles are equipped with restraint systems, such as seat belts, and inflatable restraint systems, such as airbags, to secure safety for passengers. However, in some situations, these safety devices could actually injure the occupants. For example, an occupant of the front passenger seat may be injured by the deployment of an airbag if the occupant is a baby or child. In recent years, there is a trend for controlling the operation of such safety devices according to the weight of a passenger for improved performance of seat belts and airbags. For example, the amount of gas introduced into the airbag, an airbag inflating speed, or a pre-tension of the seat belt are adjusted according to the weight of a passenger. For that purpose, it is desirable to provide a device for measuring the weight of a passenger sitting on a vehicle seat and preventing or modifying the actuation of the airbag when the weight is less than a predetermined amount.

There have been a number of proposals for the measurement of occupant weight, all with significant disadvantages. One known device provides a gel-filled cushion integrally attached to the vehicle seat, as described in U.S. Pat. No. 6,041,658. The pressure on the liquid in the cushion is measured to determine the occupant's weight. The disadvantage of this known device is that the accuracy of the weight measurement varies with the position of the occupant and the angle of the vehicle seat back. Furthermore, the puncture-resistance feature of the gel-filled bag is not perfect. The gel-filled bags often have a sealing problem or get punctured, resulting in gel leakage from the bag. If the leakage is undetected, the weight measurement result will be inaccurate. Accordingly, it is desirable to provide a reliable weight measurement system that provides an accurate measurement regardless of the seated position of the occupant or the position of the vehicle seat back.

Another known measurement system includes the use of force sensors at a plurality of support points on the seat. Typically, four load cells are used, each located at one of the four corners of the seat, between the seat and the vehicle floor. The disadvantage of this system is that each sensor significantly increases the cost of the weight detection system. Furthermore, depending on the seat configuration and the occupant position, the weight measured by each sensor could vary, resulting in a wide range of force difference between the sensors. Generally, electronics are used to average the signals received by the sensors to determine an average weight sensed by the four sensors. However, the averaging process introduces further errors in the measurement. Also, the load cells themselves can be damages by crash forces or other overloads.

Accordingly, it is desirable to provide an accurate weight measurement system that is also cost-efficient, easy to install and repair. It is further desirable to provide a system that provides failure detection capability that alerts the user of a failure and thus reduces the risk of incorrect information provided to a safety restraint system. In the event that the vehicle floor or seat becomes distorted, a wracking load may be placed on the load sensors, and the unequal loading may result in inaccurate weight measurement. Accordingly, it is desirably to provide a system that can transfer wracking loads effectively to avoid inaccurate measurement of the passenger's weight. Finally, a weight measurement system that protects the sensor itself from overloads is highly desirable.

SUMMARY OF THE PREFERRED EMBODIMENTS

A weight measurement system is disclosed for measuring the weight of an occupant in a vehicle seat. In a preferred embodiment, a sensor is positioned at the close to the fore-and-aft center of gravity of an occupant of a vehicle seat and a load transfer link is used to transfer the weight from the front portion of the vehicle seat to the sensor to be measured. The transfer link is a selectively compliant beam having a first rigid section and a second rigid section connected to each other via a flexible area. The first and second rigid sections preferably include wing portions for increasing the rigidity of the sections. The flexible area is more compliant than the rigid sections. In one embodiment of the invention, the flexible area has a jog to increase the flex. The load transfer link is configured to transition a load placed on the front portion of the link to the rear portion. In a more preferred embodiment of the invention, the load transfer link is made of a high strength, low alloy steel.

In a preferred embodiment of the invention, the load transfer link is connected to the vehicle seat and the rail assembly using bushings and fasteners. In one embodiment of the invention, the front portion of the transfer link is connected to the front portion of the vehicle seat using a bolt and an elastic or plastic bushing. Similarly, the rear portion of the transfer link is connected to the rear portion of the vehicle seat using a bolt and an elastic or plastic bushing. The bushing is compliant, thus allowing the transfer link to move in an angular direction but restricting the translational movement.

Similarly, the transfer link is preferably attached to the mounting bar of the rail assembly by bushings and fasteners. In one embodiment of the invention, the transfer link is attached to the top of the mounting bar, such that the transfer link is seated between the vehicle seat and the mounting bar. In another preferred embodiment of the invention, the transfer link is attached below the mounting bar, such that it is seated between the fixed rail and the mounting bar. In this embodiment, the transfer link is positioned to allow the link to sustain maximum crash forces, thus reducing the risk of failure and the cost of repair.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
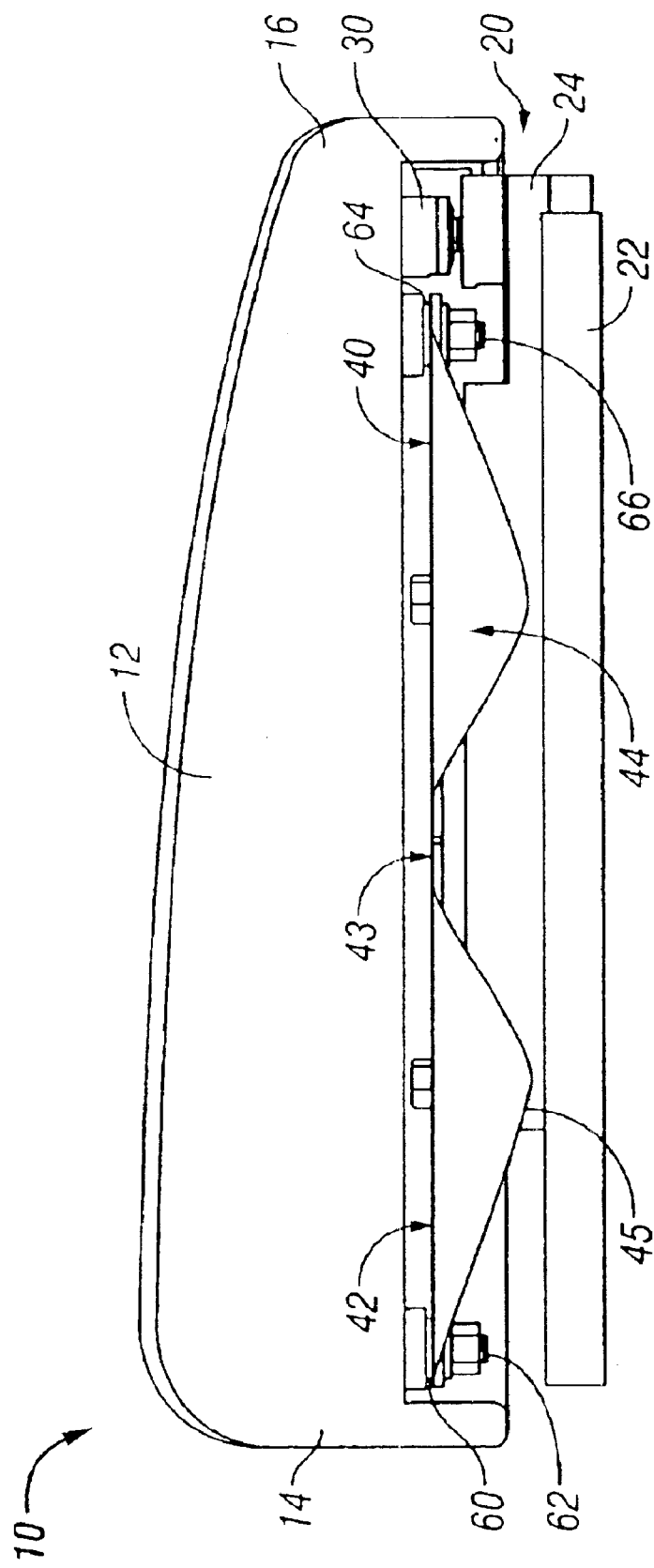
FIG. 1 is a side cross-sectional view of a preferred embodiment of the seat weight measurement system of the present invention.
Figure 2:
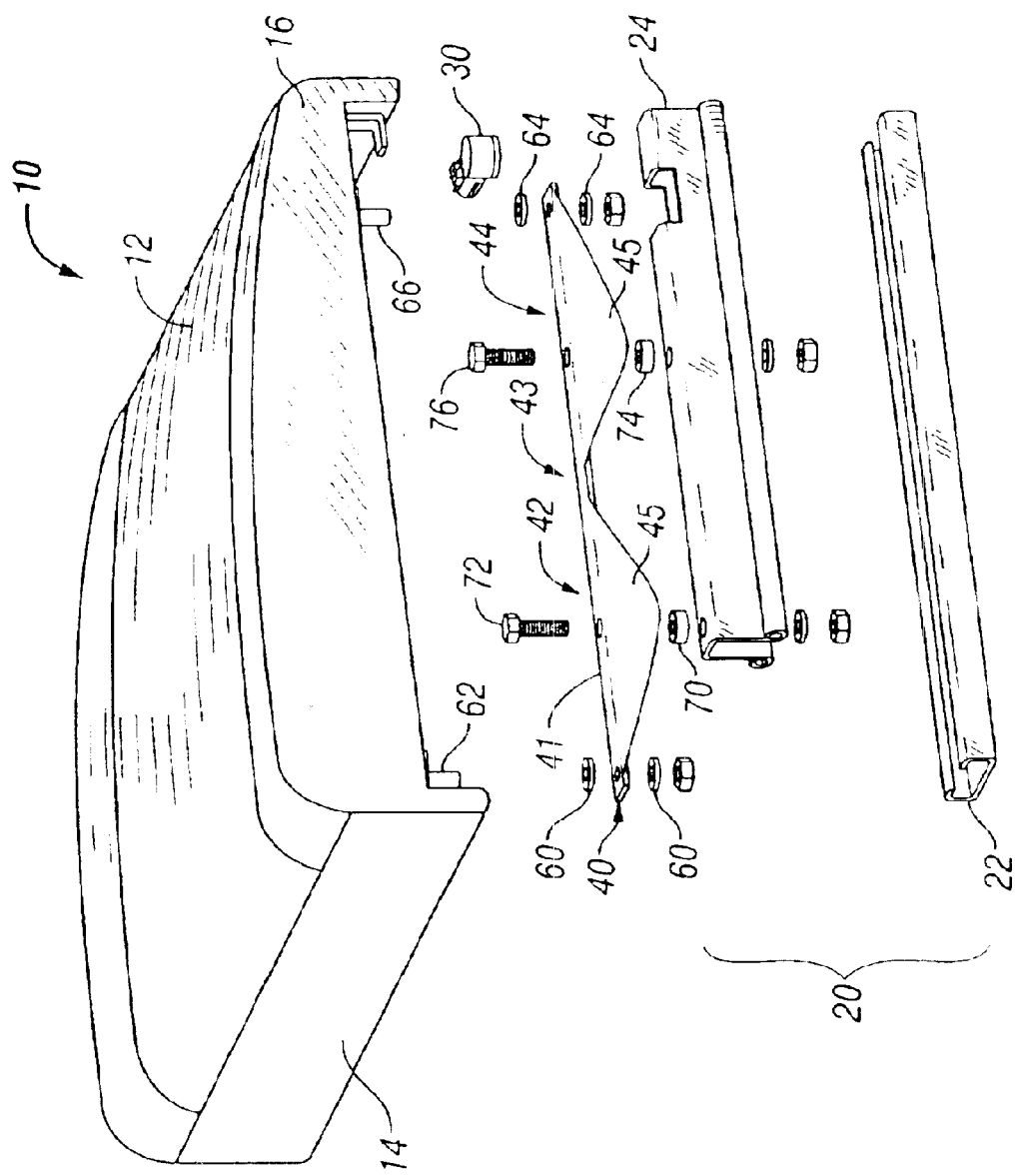
FIG. 2 is an exploded view of a preferred embodiment of the seat weight measurement system of the present invention.

A preferred embodiment of the seat weight measurement system 10 of the present invention is shown in FIGS. 1 and 2. FIG. 1 is a cross-section of the seat weight measurement system 10 and shows the components of the system on one side of the vehicle seat. The identical components are provided on the other side of the vehicle seat. For the purposes of simplicity, only the components of one side are shown. Similarly, FIG. 2 shows the exploded view of the seat weight measurement system on one side of the vehicle seat.

The seat weight measurement system 10 measures the weight of a vehicle occupant seated in a vehicle seat 12. As shown in FIGS. 1 and 2, the vehicle seat 12 includes a front portion 14 and a rear portion 16. The front portion 14 and rear portion 16 are used herein to refer generally to the front and back regions, respectively, and should not be interpreted to be limited to the front edge and the back edge of the seat. The seat 12 is mounted on the vehicle floor (not shown) by a rail assembly 20, including a fixed rail member 22 and a mounting bar 24. The fixed rail member 22 is attached to the floor of the vehicle and the mounting bar 24 slidably engages the fixed rail member 22 to move the seat 12 forward and backward.

Typically, the heaviest portion of a vehicle seat is the seat back (not shown) and therefore, the center of gravity of an occupied vehicle seat is toward the back of the seat, near the seat back itself. Moreover, a person seated on a vehicle seat typically leans back against the seat back, resulting in a center of gravity of the person to also be near the back of the seat. Accordingly, for an accurate measurement of the system, the weight of the seat and the occupant should be measured at the rear portion 16 of the vehicle seat. In this regard, a pair of sensors 30 are provided at the rear portion of the vehicle seat. The sensors used can be of any type known in the art capable of measuring a load placed thereon and providing a signal corresponding to the measured load. In a preferred embodiment of the invention, the force sensor used is a load cell commercially available from Kavlico Corporation in Moorpark, Calif. The sensor is preferably a ceramic capacitive element having a digitally calibrated signal conditioner. The sensor should be capable of remaining stable over an extended period of use and should withstand high overload conditions.

Although, as discussed above, in the typical situation the majority of the weight will be placed at the rear portion 16 of the vehicle seat 12, some of the occupant's weight will be distributed along the length of the seat, between the front portion 12 and the rear portion 14. In prior known devices, additional sensors were added to measure the weight distributed in the front portion of the seat. For example, in one known system, strain gages are placed on each corner of the vehicle seat. However, the addition of sensors adds to the cost of the measurement system. Furthermore, the strain gages in the front may be placed under tensile forces which may not be accurately measured. Thus, the strain gages introduce an additional error factor into the weight measurement system.

In a preferred embodiment of the invention, a load transfer link 40 is provided for transferring the weight of the occupant from the front portion 14 of the vehicle seat to the sensors 30 located at the rear portion 16 of the vehicle seat. The transfer link 40 is preferably a single, integral structural member that substantially extends across the length of the vehicle seat 12 from the front portion 14 to the rear portion 16. The load transfer link 40 is a selectively compliant beam comprised of a spine 41, a first rigid section 42, a flexible area 43 and a second rigid section 44. In the first and second rigid section 42, 44, the transfer link includes wing portions 45 extending from the spine 41 to increase the stiffness of the rigid sections. The transfer link 40 is more compliant in the flexible area 43 than in the rigid sections 42, 44 to facilitate the load transfer from the front portion to the rear portion. In a preferred embodiment of the invention, the load transfer link is made of a high strength, low alloy steel.

Figure 3:
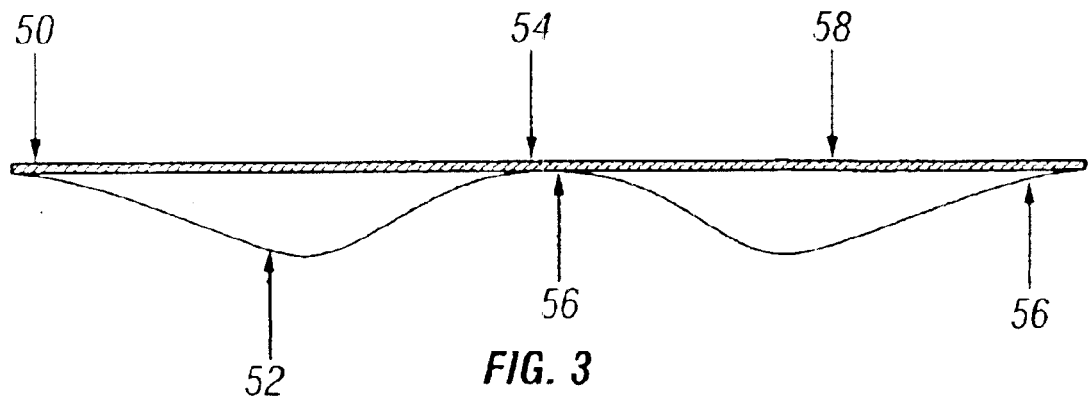
FIG. 3 depicts the load on the transfer link as it is transferred from the front portion of the vehicle seat to the rear portion.

As shown in FIG. 3, the load 50 at the front portion 14 of the vehicle seat 12 results in a primary reaction load 52. At the center of the link 54, there is a transfer of the load to the rear part of the link 56. The force at 56 is upward on the link resulting in a downward secondary reaction force at 58 and finally a downward force applied to the seat at 56. The length of the link sections 42 and 46 are configured such that the force at the rear portion of the vehicle seat will be equal to the original load 50 placed at the front of the seat. In this configuration, the sensor 30 will be able to measure the load regardless of the position of the weight.

In a preferred embodiment of the invention, as best shown in FIGS. 1 and 2, the weight measurement system of the present invention is integrated at the seat/rail interface. By not integrating the system into the rail/vehicle floor interface, the weight measurement system of the present invention remains unaffected by any seat position changes. Moreover, the installation of the seat assembly to the vehicle floor remains unchanged.

Referring to FIGS. 1 and 2, the vehicle seat 12 and the mounting bar 24 are attached using elastic bushings, bolts or other pivots known by those skilled in the art. A front bushing 60 is provided at the front portion 14 of the vehicle seat and, in conjunction with a front bolt 62, is used to attach the front portion 14 of the vehicle seat to the front portion 46 of the transfer link 40. The front bushing 60 is compliant and allows the transfer link 40 to rotate but does not allow significant translation of the mounting bar 24 relative to the vehicle seat 12. Similarly, a back bushing 64 is provided at the rear portion 16 of the vehicle seat and, in conjunction with a back bolt 66, is used to attach the rear portion 16 of the vehicle seat to the rear portion 48 of the transfer link. The bushings are preferably elastic rubber, and more preferably Neoprene, having a durometer of about 70 to 90 Duro. It is within the scope of the present invention to replace the bolts with any known fastener and the bushings with other known pivot means.

In a preferred embodiment of the invention, as shown in FIG. 2, the transfer link 40 is attached to the mounting bar 24 using elastic bushings and bolts. A first bushing 70 and first bolt 72 attach the first rigid section 42 of the transfer link 40 to the mounting bar 24. Similarly, a second bushing 74 and second bolt 76 attach the second rigid section 44 of the transfer link 40 to the mounting bar 24. All bushings are preferably elastic, as described above, and more preferably allow maximum angular compliance.

In the embodiment shown in FIG. 2, the first and second bolts 72, 76 are vertically fastened into the spine 41 of the transfer link. In another preferred embodiment of the invention, the first and second bolts 72, 76 can be positioned horizontally such that the first and second bolts 72, 76 extend horizontally through the wing portions 45 of the first rigid section 42 and second rigid section 44, respectively.

The positioning of the load transfer link 40 above the mounting bar 24, as shown in FIGS. 1 and 2, limits the vertical movement of the transfer link 40 and therefore reduces the risk of failure of the transfer link 40. For example, if a person drops his or her weight into the vehicle seat with great force, the transfer link will not break (or otherwise fail) because the movement of the link 40 is limited in the downward direction by the mounting bar 24.

Figure 5:
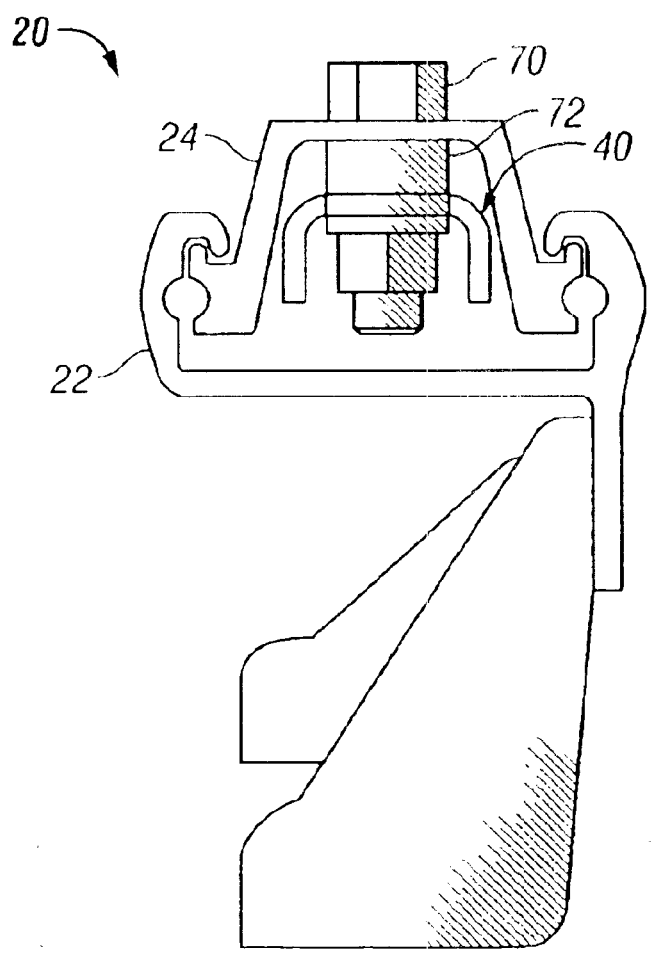
FIG. 5 is a front view of the seat weight measurement system shown in FIG. 4.
Figure 4:
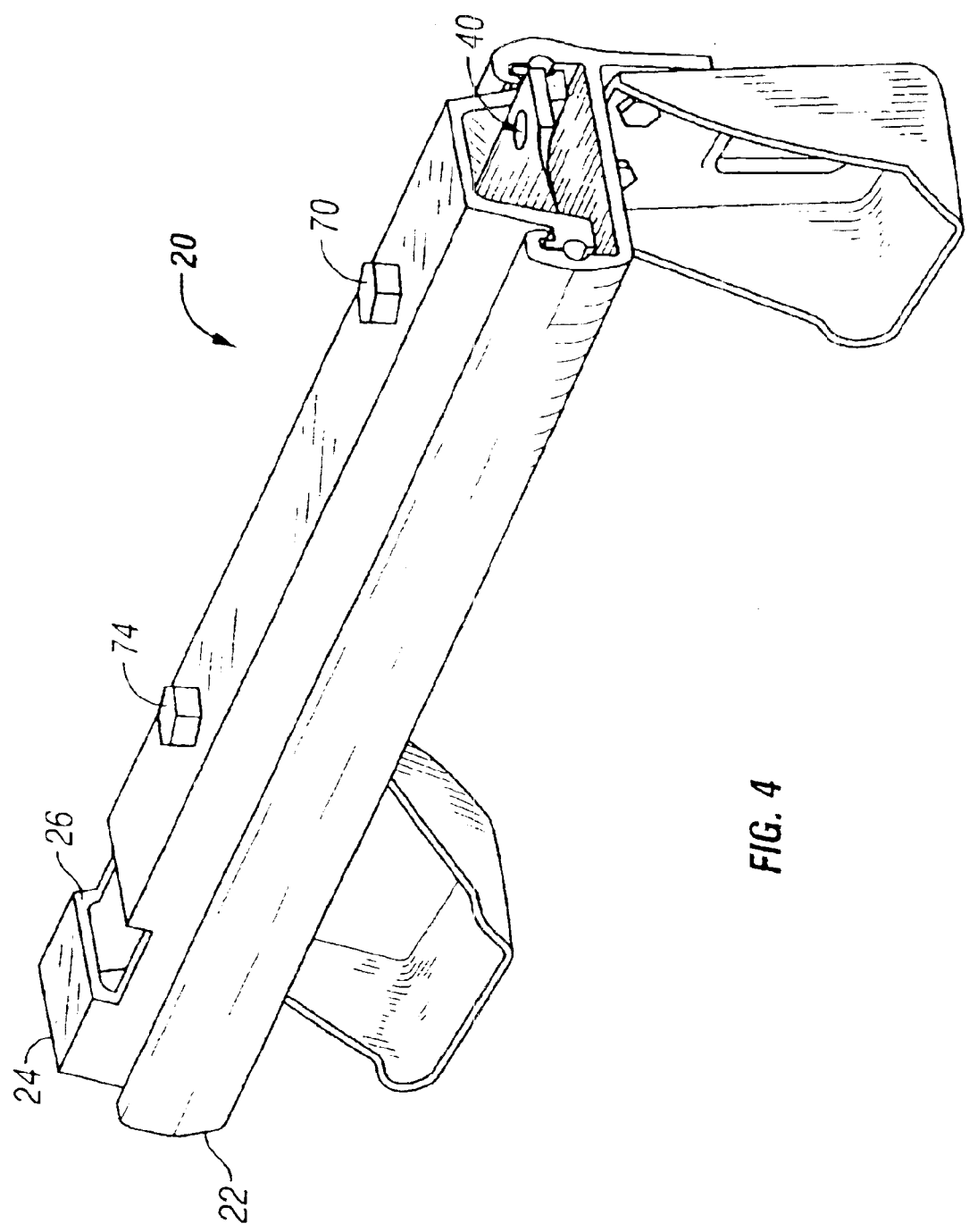
FIG. 4 is a perspective view of another preferred embodiment of the seat weight measurement system of the present invention.
Figure 6:
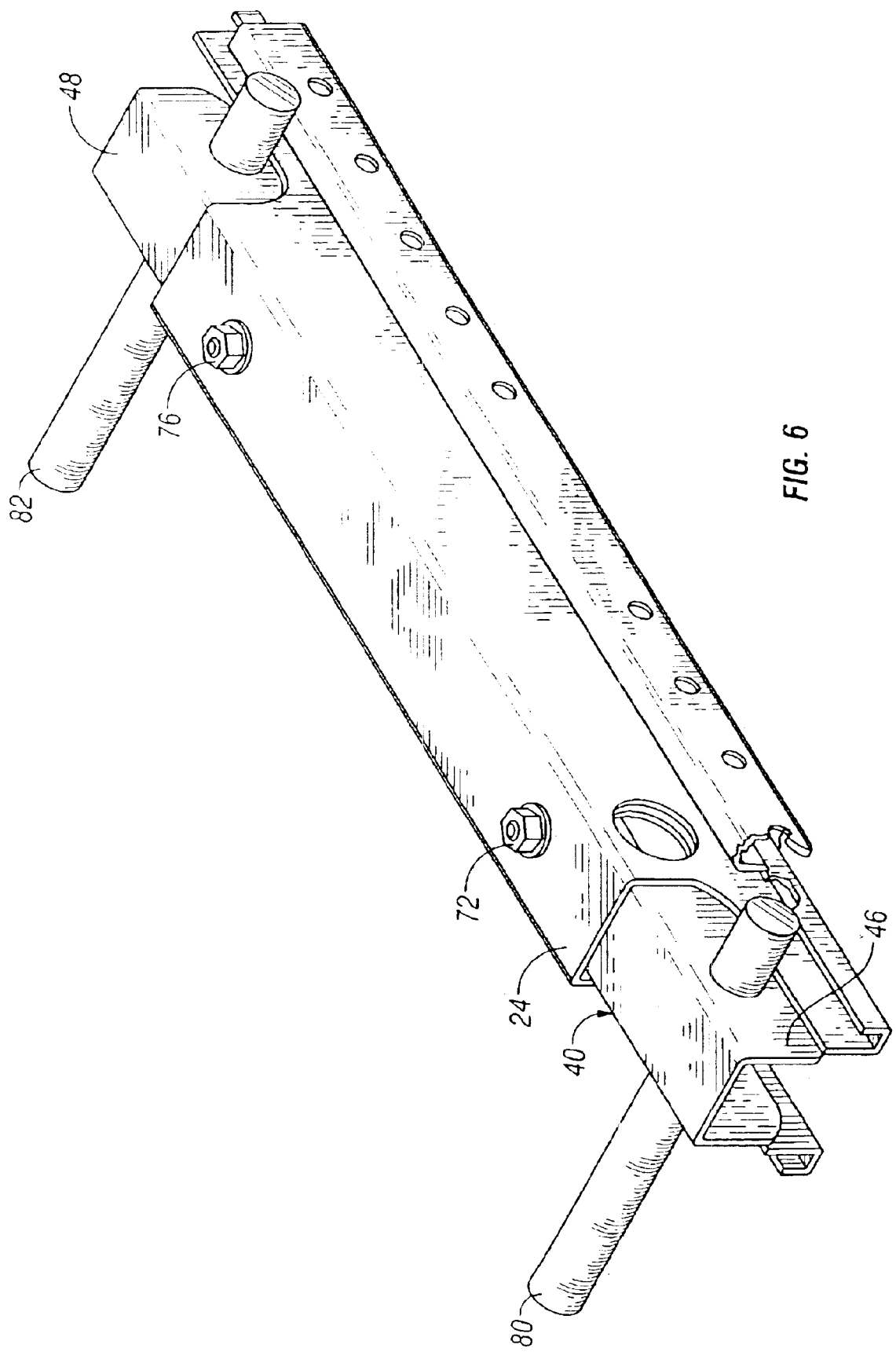
FIG. 6 is a perspective view of yet another preferred embodiment of the seat measurement system of the present invention wherein components of the seat adjustment mechanism are used as pivots.

In a more preferred embodiment of the invention, as shown in FIGS. 4 and 5, the load transfer link is positioned between the fixed rail member 22 and the mounting bar 24 of the rail assembly 20. As in the previously described embodiment, the load transfer link 40 is attached to the mounting bar 24 by first and second bushings 70, 74 and first and second bolts 72, 76. The difference is that the load transfer link 40, instead of being connected above the mounting bar 24, is connected below the mounting bar 24. In this embodiment, the load transfer link 40 is further protected from crash forces by being enclosed by the mounting bar 24 and the fixed rail member 22. The front portion 46 of the load transfer link 40 extends outside the mounting bar 24 for attachment with the front portion 14 of the vehicle seat 12. The rear portion 48 of the load transfer link is in communication with the sensor 30. To enable the load transfer link to access the sensor 30, an opening 26 may be provided in the mounting bar 24. Alternatively, a sensor 30 can be positioned between the mounting bar 24 and the load transfer link 40.

In another preferred embodiment of the invention, as shown in FIGS. 6 through 9, the seat weight measurement system 10 includes a load transfer link 40 integrated with seat adjustment components 80, 82. This configuration eliminates the need for end bushings by the existing seat adjustment components as pivots. Referring to FIGS. 6 through 9, in a preferred embodiment of the seat weight measurement system 10, the load transfer link 40 measures the weight of an occupied seat through the seat adjustment components 80, 82. The seat adjustment component may be a seat adjustment lever or other component that is capable of transferring the weight of a seat and an occupant to the load transfer link 40. The first seat adjustment component 80 preferably attaches to a front portion 46 of the transfer link 40. The second seat adjustment component 82 preferably attaches to a rear portion 48 of the transfer link 40. The first and second seat adjustment components 80, 82 are attached in a manner that enables the load transfer link 40 to rotate in order to transfer the measured weight to the sensor.

Figure 7:
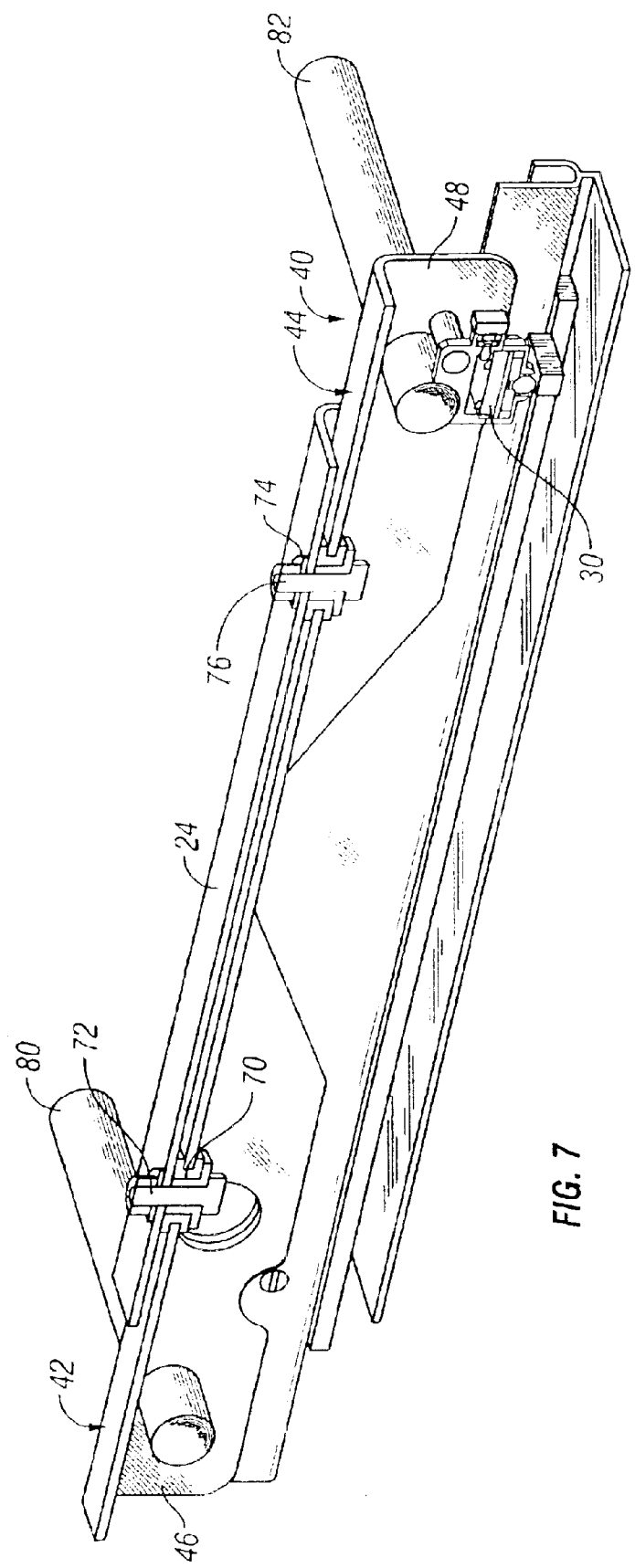
FIG. 7 is a perspective cross-sectional view of the seat weight measurement system shown in FIG. 6.
Figure 8:
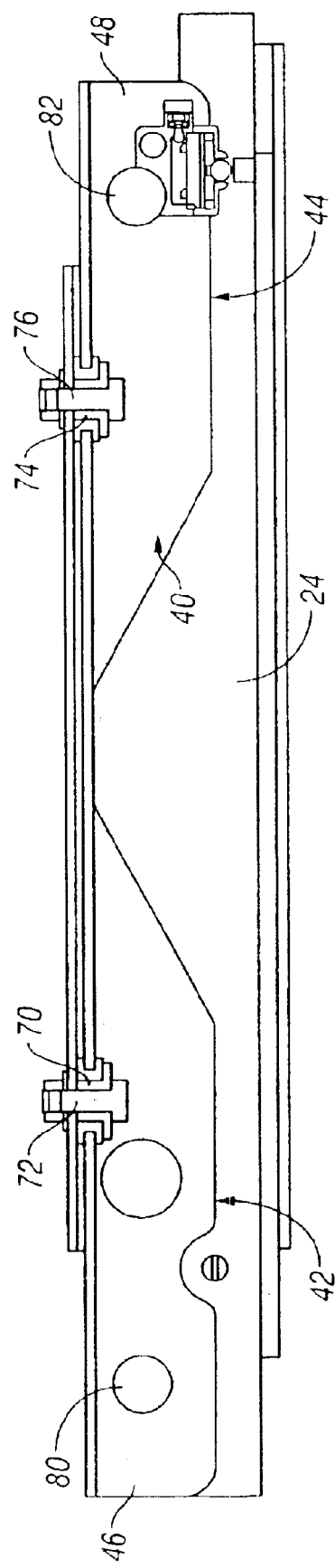
FIG. 8 is a side cross-sectional view of the seat weight measurement system shown in FIG. 6.

The transfer link 40 is preferably attached to the mounting bar 24 using elastic bushings and bolts. As best shown in FIGS. 7 and 8, a first bushing 70 and a first bolt 72 attach the first rigid section 42 of the transfer link 40 to the mounting bar 24 and a second bushing 74 and a second bolt 76 attached the second rigid section 44 of the transfer link 40 to the mounting bar 24.

Figure 9:
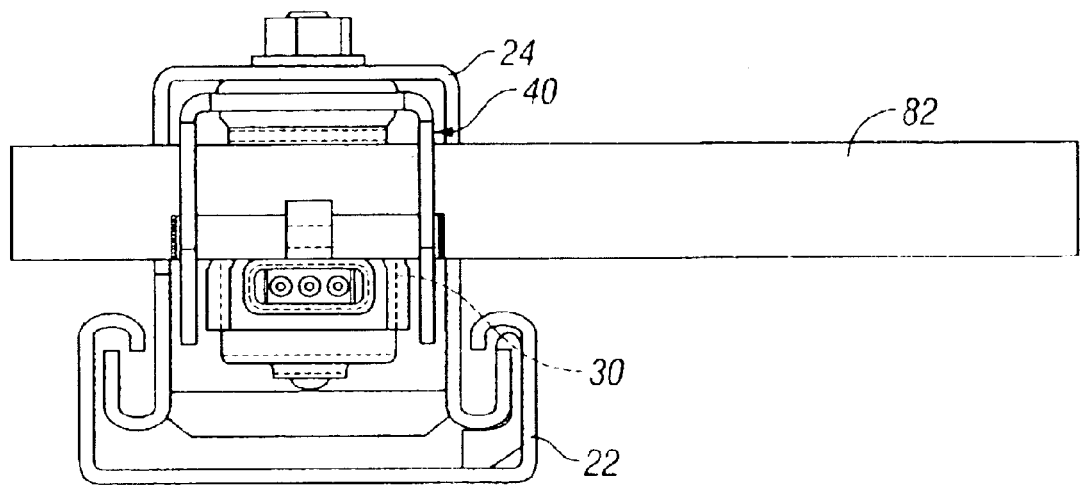
FIG. 9 is a rear view of the seat weight measurement system shown in FIG. 6.

The load transfer link 40 transfer the weight of the occupant to the sensor for measurement. The position of the sensor 30 may vary as long as the sensor receives the load transferred by the link. In a preferred embodiment, as shown in FIG. 9, the sensor is located in the seat assembly and moves with the seat. In the embodiment shown in FIG. 9, the sensor 30 is provided between the mounting rail 24 and the fixed rail member 22. This arrangement provides for the most accurate measurement since the center of gravity of the seat remains stationary with respect to the sensor.

Figure 10:
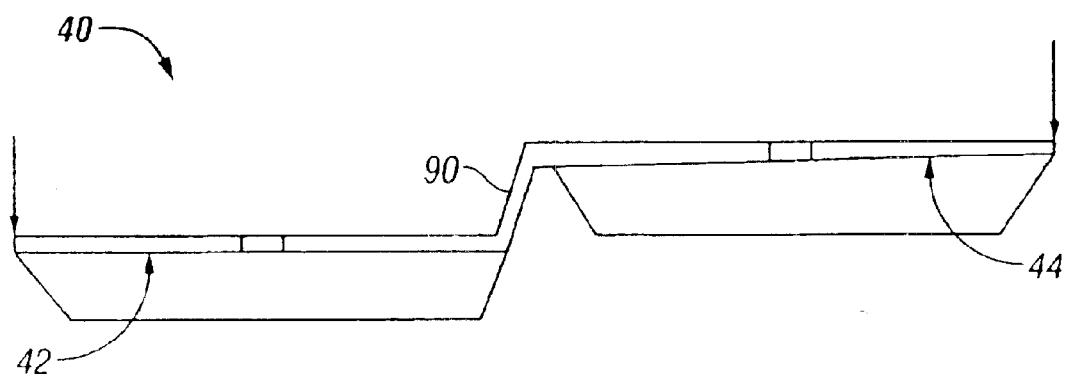
FIG. 10 is a side view of another preferred embodiment of the seat weigh measurement system of the present invention having a jog.

FIG. 10 depicts another embodiment of the load transfer link 40 of the present invention. As shown in FIG. 10, the load transfer link 40 may include a jog 90 for connecting the first rigid section 42 and the second rigid section 44. The jog 90 preferably provides increased flex in the load transfer link to facilitate the transfer of weight.

Figure 11:
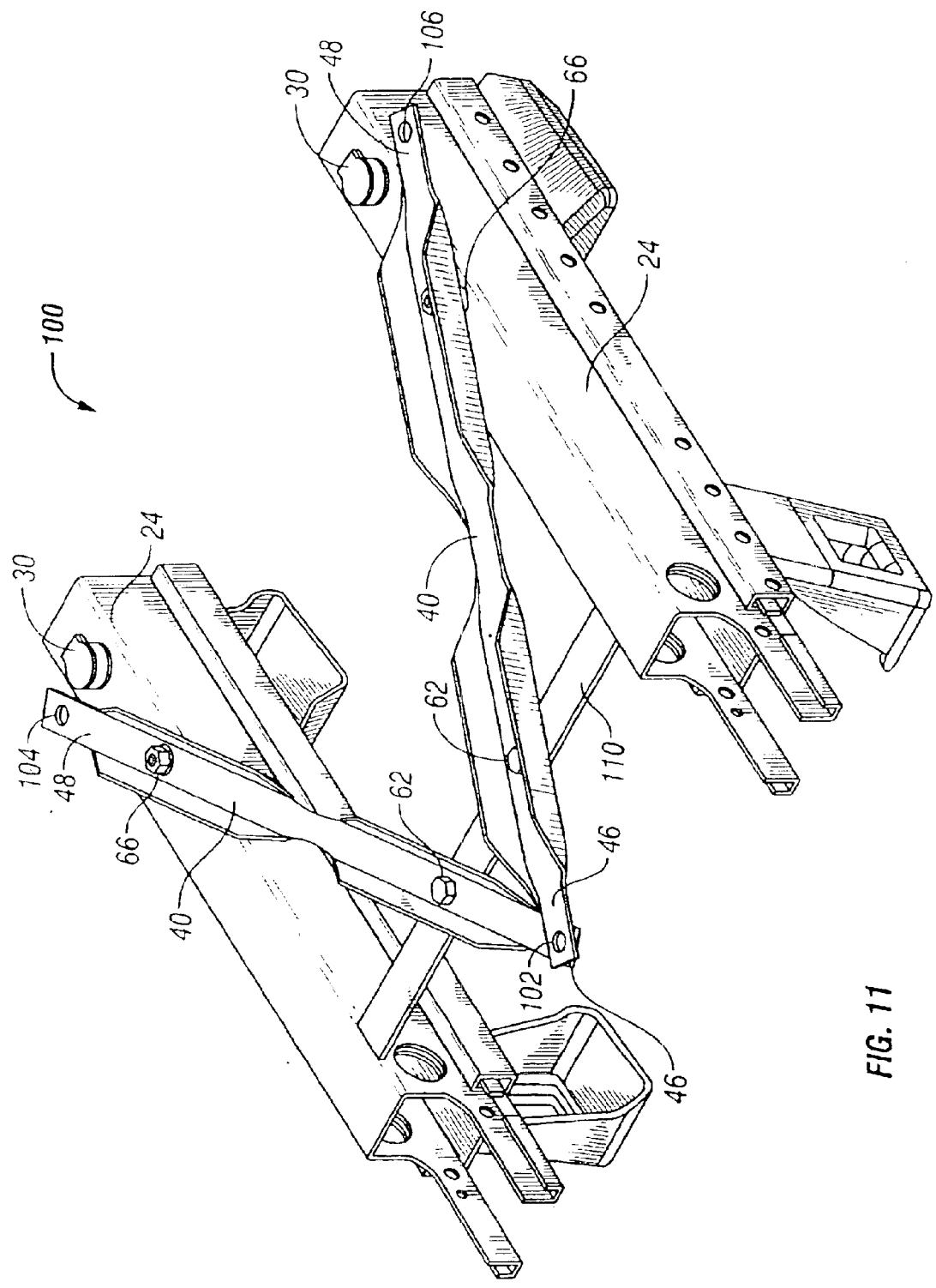
FIG. 11 is a perspective view of another preferred embodiment of the seat weight measurement system of the present invention having a three-point attachment.
Figure 12:
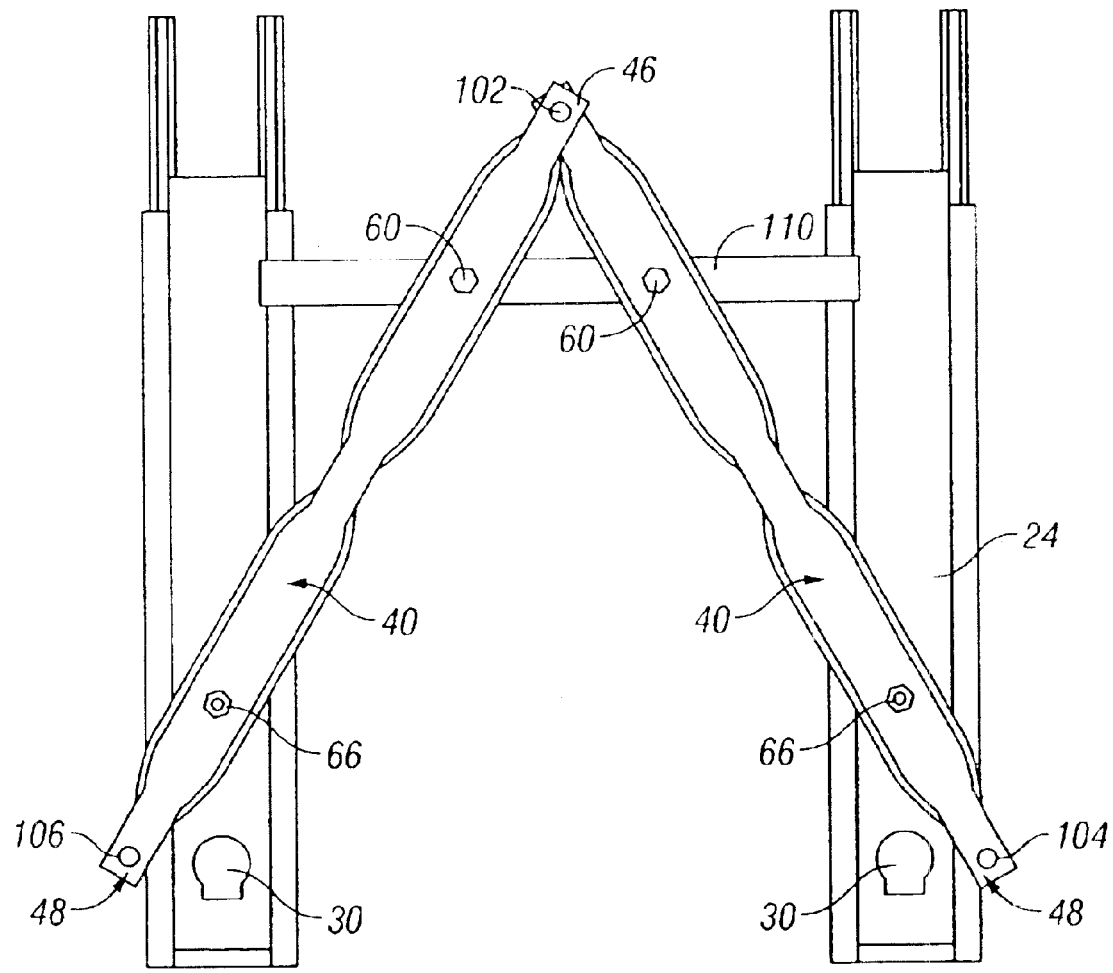
FIG. 12 is a top plan view of the seat weight measurement system shown in FIG. 11.

FIGS. 11 and 12 depict another embodiment of the seat weight measurement system of the invention wherein the a three-point mounting technique is used to attach the vehicle seat to the transfer link. As with the embodiments previously described, the seat weight measurement system 100 shown in FIGS. 11 and 12, utilizes two sensors 30 and two load transfer links 40 to transfer the weight of the occupant to the sensors 30. The sensors are preferably positioned between the vehicle seat (not shown) and the mounting bar 24. Instead of installing the transfer links 30 in a parallel relationship to each other and coaxial with the mounting bar 24, the transfer links 40 are installed in a diagonal V-formation such that the front ends 46 of the transfer links 40 meet at a common connection point 102. The vehicle seat is preferably mounted to the transfer links 40 at the common connection point 102, at a first rear connection point 104 and at the second rear connection point 106. The front pivots 62 and back pivots 66 operate in the same manner as the pivots disclosed above. To accommodate the three-point mounting, the front pivots 62 are attached to a connecting bar 110.

By orienting the transfer links 40 in the manner shown in FIGS. 11 and 12, the seat is supported at only three locations, making the system impervious to wracking distortions of either the seat or the vehicle floor. The common connection point 102 can be positioned either at the front or the rear portion of the vehicle seat. However, because the seat load is typically less at the front of the seat, it is preferred that the common connection point 102 be positioned at the front.

The seat weight measurement system of the present invention provides accurate measurement of the weight of an occupant in a vehicle seat. By using a transfer link in conjunction with sensors in the rear portion of the vehicle seat, the system of the present invention minimizes mechanical and electrical complexity and maximizes reliability and accuracy. The positioning of the transfer link and the sensors at the interface of the rail assembly and the seat, enhances the structural integrity of the system, minimizing the risk of failure and reducing warranty and crash repair costs. Furthermore, the transfer link is capable of effectively transferring wracking loads so as to ensure the accuracy of the weight measurement.

Those skilled in the art may make numerous uses of, and departures from, the above-described embodiments without departing from the inventive concepts disclosed herein. For instance, the pivots used in conjunction with the load transfer to facilitate the transfer of weight can be substituted with other fasteners or seat components. Furthermore, the relative distances between the pivots of the load transfer link can be adjusted to provide desired characteristics. By way of example, a medium weight person siting on the front edge of the seat might require the air bag deployment to be reduced, while a lighter weight person sitting at the rear of the seat may require stronger deployment. Accordingly, the load transfer link can be configured to amplify the weight at the front of the seat to compensate for this effect.

The embodiments described above are exemplary embodiments of a seat weight measurement system. Accordingly, the present invention is to be defined solely by the scope of the following claims.

What is claimed is:

1. A weight measure system, comprising:
   a vehicle seat having a first portion and a second portion;
   a sensor positioned at the first portion of the seat; and
   a transfer link extending substantially from the first portion of the seat to the second portion, wherein the transfer link is a beam configured to transfer weight from the second portion of the seat to the first portion, the transfer link including a compliant portion separated from the sensor by a rigid portion.

2. A weight measurement system for measuring the weight of an occupant in a vehicle seat, the seat having a first portion and a second portion, the weight measurement system comprising:
   a pair of sensors positioned at the first portion of the seat;
   a pair of transfer links extending substantially from the first portion of the seat to the second portion; and
   wherein the transfer links are selectively compliant beams configured to transfer weight from the second portion of the seat to the first portion, each transfer link including a first rigid section, a second rigid section and a flexible area between the first and second rigid sections.

3. A weight measurement system for measuring the weight of an occupant in a vehicle seat, the seat having a first portion and a second portion, the weight measurement system comprising:
   a sensor positioned at the first portion of the seat;
   a transfer link extending substantially from the first portion of the seat to the second portion; and
   wherein the transfer link is a selectively complaint beam configured to transfer weight from the second portion of the seat to the first portion, the transfer link including a first rigid section, a second rigid section and a flexible area between the first and second rigid sections.

4. The weight measurement system of claim 3 wherein the transfer link further includes a spine, a first wing portion extending from the spine at the first rigid section, and a second wing portion extending from the spine at the second rigid section.

5. The weight measurement system of claim 3 wherein the transfer link is fastened to the vehicle seat using a bolt.

6. The weight measurement system of claim 3 further comprising a compliant bushing positioned between the transfer link and the seat.

7. The weight measurement system of claim 3 wherein the transfer link is fastened to the seat at the first portion and the second portion.

8. The weight measurement system of claim 4 further comprising a rail assembly having a fixed rail member and a mounting bar slidably engaged with the fixed rail member, and wherein the transfer link is attached to the mounting bar.

9. The weight measurement system of claim 8 wherein the transfer link is fastened to a top surface of the mounting bar.

10. The weight measurement system of claim 9 wherein the transfer link is positioned between the mounting bar and the fixed rail member.

11. A weight measurement system for measuring the weight of an occupant in a vehicle seat, the seat having a first portion and a second portion, the weight measuring system comprising:
    a sensor positioned at the first portion of the seat;
    a transfer link extending substantially from the first portion of the seat to the second portion, the transfer link having a first rigid section, a second rigid section and a flexible area between the first and second sections, a spine, a first wing portion extending from the spine at the first rigid section, and a second wing portion extending from the spine at the second rigid section;
    a rail assembly having a fixed rail member and a mounting bar slidably engaged with the fixed rail member, wherein the mounting bar is connected to the transfer link via a first bushing and a first fastener; and
    wherein the transfer link is connected to the vehicle seat via a second bushing and a second fastener.

12. A method of measuring the weight of an occupant seated in a vehicle seat, the vehicle seat having a first portion and a second portion, the method comprising the steps of:
    providing sensors in the first portion of the vehicle seat;
    transferring the occupant's weight from the second portion of the seat to the first portion; and
    measuring the occupant's weight at the first portion of the seat;
    wherein the transfer link includes a first rigid section, a second rigid section and a flexible area between the first and second rigid sections.

13. The method of claim 12 wherein the occupant's weight is transferred from the second portion of the seat to the first portion using a transfer link.

14. The method of claim 13 wherein the flexible area is more compliant that the first and second regions.

15. The method of claim 14 further providing a rail assembly having a fixed rail member and a mounting bar slidably engaged with the fixed rail member, and wherein the transfer link is connected to the mounting bar.

16. A method of measuring the weight of an occupant seated in a vehicle seat, the vehicle seat having a first portion and a second portion, the method comprising the steps of:
    providing sensors in the first portion of the vehicle seat, and a transfer link extending from the first portion of the vehicle seat to the second portion of the vehicle seat, the transfer link including a first rigid section, a second rigid section and a flexible area between the first and second rigid sections;

transferring the occupant's weight from the second portion of the seat to the first portion; and measuring the occupant's weight at the first portion of the seat.

17. A weight measurement system for measuring the weight of an occupant in a vehicle seat having a first portion and a second portion, the seat and the occupant each having a respective center of gravity, the system comprising:

a sensor positioned at a sensor location; and a transfer link extending substantially from a second location to the sensor location, wherein the transfer link is a compliant beam configured to transfer weight to the sensor from the second location, the transfer link including a compliant portion separated from the sensor by a rigid portion.

18. The weight measurement system of claim 17 wherein the sensor location is substantially under the center of gravity of the seat.

19. The weight measurement system of claim 17 wherein the sensor location is substantially under the center of gravity of the occupant.

* * * * *